US008190763B2

(12) United States Patent
Savoor et al.

(10) Patent No.: US 8,190,763 B2
(45) Date of Patent: May 29, 2012

(54) SYSTEM AND METHOD FOR TROUBLE DETECTION, ISOLATION, AND MANAGEMENT

(75) Inventors: Raghvendra Savoor, Walnut Creek, CA (US); Zhi Li, Martinez, CA (US); Jian Li, San Ramon, CA (US); Arvind Ramdas Mallya, Walnut Creek, CA (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 131 days.

(21) Appl. No.: 11/972,370

(22) Filed: Jan. 10, 2008

(65) Prior Publication Data
US 2009/0077257 A1  Mar. 19, 2009

Related U.S. Application Data

(60) Provisional application No. 60/972,580, filed on Sep. 14, 2007.

(51) Int. Cl.
*G06F 15/16* (2006.01)
(52) U.S. Cl. ................... 709/232; 714/E11.144
(58) Field of Classification Search .......... 709/232; 714/E11.144
See application file for complete search history.

(56) References Cited

U.S. PATENT DOCUMENTS

| | | | |
|---|---|---|---|
| 6,006,248 A * | 12/1999 | Nagae | 718/105 |
| 6,819,654 B2 * | 11/2004 | Soloway et al. | 370/238 |
| 7,894,427 B2 * | 2/2011 | Jayasenan et al. | 370/389 |
| 2002/0087715 A1 * | 7/2002 | De Cnodder et al. | 709/235 |
| 2002/0087716 A1 * | 7/2002 | Mustafa | 709/236 |
| 2004/0003112 A1 * | 1/2004 | Alles et al. | 709/237 |
| 2006/0039367 A1 | 2/2006 | Wright et al. | |
| 2006/0041688 A1 | 2/2006 | Wright et al. | |
| 2006/0156403 A1 * | 7/2006 | Haeffele et al. | 726/23 |
| 2006/0221971 A1 * | 10/2006 | Andrieux et al. | 370/392 |
| 2007/0097860 A1 | 5/2007 | Rys et al. | |
| 2007/0104215 A1 * | 5/2007 | Wang et al. | 370/458 |
| 2007/0201446 A1 * | 8/2007 | Wright | 370/356 |
| 2007/0220142 A1 * | 9/2007 | Moorer et al. | 709/224 |
| 2008/0101405 A1 * | 5/2008 | Wirick et al. | 370/468 |
| 2008/0307081 A1 * | 12/2008 | Dobbins et al. | 709/223 |
| 2009/0037601 A1 * | 2/2009 | Jain et al. | 709/242 |
| 2009/0323516 A1 * | 12/2009 | Bhagwan et al. | 370/216 |

OTHER PUBLICATIONS

Cisco, Rate Limiting NAT Translation, 2003.*

* cited by examiner

*Primary Examiner* — Brian P Whipple
(74) *Attorney, Agent, or Firm* — Pablo Meles; Guntin Meles & Gust, PLC

(57) ABSTRACT

A method of detecting and isolating a fault includes collecting information regarding utilization of a resource of a device. The method further includes predicting the fault based on the information and modifying operation of the device in response to the fault.

13 Claims, 8 Drawing Sheets

SYSTEM AND METHOD FOR TROUBLE DETECTION, ISOLATION, AND MANAGEMENT

CROSS-REFERENCE TO RELATED APPLICATION(S)

This application claims priority to U.S. Provisional Patent Application No. 60/972,580, entitled "System and Method for Trouble Detection, Isolation, and Management," filed on Sep. 14, 2007, which is assigned to the current assignee hereof and is incorporated herein by reference.

FIELD OF THE DISCLOSURE

The present disclosure generally relates to communications networks, and more particularly relates to systems and methods for trouble detection, isolation, and management.

BACKGROUND

Telecommunications users frequently receive multiple services such as voice, video, and data from a single provider. Often, the services are combined for delivery over a single physical layer such as twisted pair, coaxial cable, or fiber. As voice and video service has traditionally been provided through a dedicated connection, subscribers expect reliable service and can be intolerant of even minor disruptions such as dropped calls or loss of picture. However, as services such as voice-over-Internet Protocol (VoIP) or Internet Protocol Television (IPTV) are combined with data service, a single point of failure is introduced for the combined services and heavy use of the data service can impact the quality of the voice and video services.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
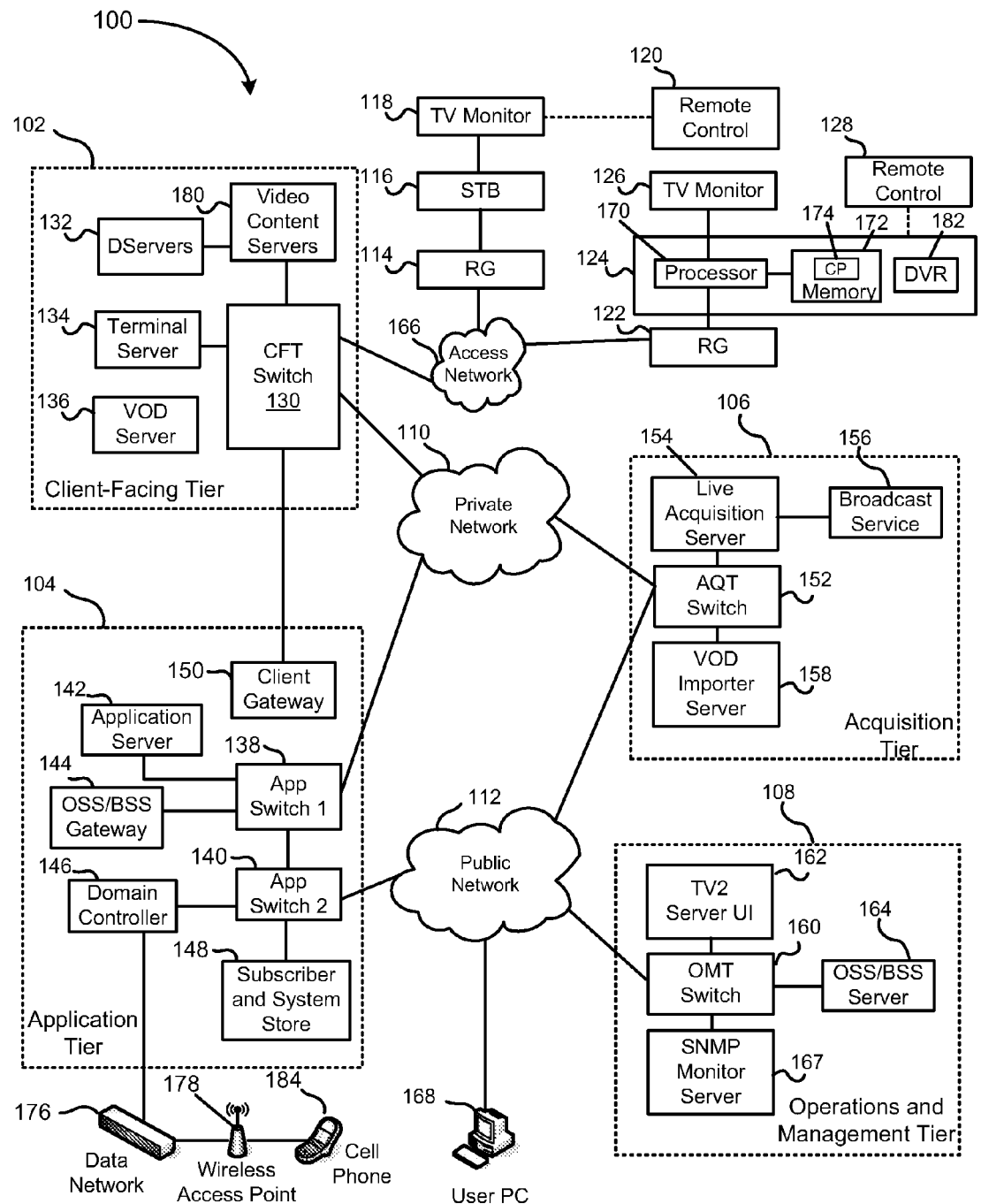
FIG. 1 is a block diagram illustrating an embodiment of an IPTV network.

FIG. 1 shows an IPTV system 100 that can include a client facing tier 102, an application tier 104, an acquisition tier 106, and an operations and management tier 108. Each tier 102, 104, 106, and 108 is coupled to a private network 110, a public network 112, or both the private network 110 and the public network 112. For example, the client-facing tier 102 can be coupled to the private network 110. Further, the application tier 104 can be coupled to the private network 110 and to the public network 112, such as the Internet. The acquisition tier 106 can also be coupled to the private network 110 and to the public network 112. Moreover, the operations and management tier 108 can be coupled to the public network 112.

The various tiers 102, 104, 106, and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, gateways such as a first residential gateway (RG) 114 and a second RG 122 can be coupled to the private access network 166. The client-facing tier 102 can communicate with a first representative set-top box device (STB) 116 via the first RG 114 and with a second representative set-top box device 124 via the second RG 122. The client-facing tier 102 can communicate with a large number of set-top boxes, such as the representative set-top boxes 116 and 124, over a wide geographic area, such as a regional area, a metropolitan area, a viewing area, or any other suitable geographic area that can be supported by networking the client-facing tier 102 to numerous set-top box devices. In an illustrative embodiment, the client facing tier or any portion thereof can be included at a video head-end office.

In one embodiment, the client-facing tier 102 can be coupled to the RGs 114 and 122 via fiber optic cables. Alternatively, the RGs 114 and 122 can include digital subscriber line (DSL) modems that are coupled to one or more network nodes via twisted pairs, and the client-facing tier 102 can be coupled to the network nodes via fiber-optic cables. Each set-top box device 116 and 124 can process data received through the private access network 166 via an IPTV software platform such as Microsoft® TV IPTV Edition.

Additionally, the first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display devices 118 and 126 to which it is coupled. In an illustrative embodiment, the set-top box devices 116 and 124 can include tuners that receive and decode television programming information for transmission to the display devices 118 and 126. The television tuner can be National Television System Committee (NTSC) tuner, an Advanced Television System Committee (ATSC), another suitable analog or digital tuner, or any combination thereof. A signal for a television channel can pass through the tuner before the content is displayed on a monitor.

In an exemplary, non-limiting embodiment, STB devices 116 and 124 can receive video content, which may include video and audio portions, from the client-facing tier 102 via the private access network 166. The STB device 116 and 124 can transmit the video content to an external display device, such as the television monitors 118 and 126. The STB devices 116 and 124 can also communicate commands received from the remote control devices 120 and 128 to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server 168 and other devices with a common connection point to the private network 110. In a particular embodiment, the CFT switch 130 can also be coupled to a video-on-demand (VOD) server 136 that stores or provides VOD content imported by the IPTV system 100. The client-facing tier 102 can also include one or more video content servers 180 that transmit video content requested by viewers via their STB devices 116 and 124. In an illustrative, non-limiting embodiment, the video content servers 180 can include one or more multicast servers.

As shown in FIG. 1, the application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions, such as display, messaging, processing of IPTV data and VOD material, etc. In a particular embodiment, the OSS/BSS gateway 144 includes operation systems and support (OSS) data, as well as billing systems and support (BSS) data.

Further, the second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166, using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the first set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138 to the second APP switch 140, and the second APP switch 140 can communicate the query across the public network 112 to an OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, for example because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment during operation of the IPTV system, the live acquisition server 154 can acquire television or movie content. The live acquisition server 154 can transmit the television or movie content to the AQT switch 152, and the AQT switch can transmit the television or movie content to the CFT switch 130 via the private network 110.

Further, the television or movie content can be transmitted to the video content servers 180, where it can be encoded, formatted, stored, or otherwise manipulated and prepared for communication to the STB devices 116 and 124. The CFT switch 130 can communicate the television or movie content to the RGs 114 and 122 via the private access network 166. The STB devices 116 and 124 can receive the television or movie content via the RGs 114 and 122, and can transmit the television or movie content to the television monitors 118 and 126. In an illustrative embodiment, video or audio portions of the television or movie content can be streamed to the STB devices 116 and 124.

Further, the AQT switch can be coupled to a VOD importer server 158 that stores television or movie content received at the acquisition tier 106 and communicates the stored content to the VOD server 136 at the client-facing tier 102 via the private network 110. Additionally, at the acquisition tier 106, the VOD 158 can receive content from one or more VOD sources outside the IPTV system 100, such as movie studios and programmers of non-live content. The VOD importer server 158 can transmit the VOD content to the AQT switch 152, and the AQT switch 152, in turn, can communicate the material to the CFT switch 130 via the private network 110. The VOD content can be stored at one or more servers, such as the VOD server 136.

When users issue requests for VOD content via the STB devices 116 and 124, the requests can be transmitted over the private access network 166 to the VOD server 136 via the CFT switch 130. Upon receiving such requests, the VOD server 136 can retrieve the requested VOD content and transmit the content to the STB devices 116 and 124 across the private access network 166 via the CFT switch 130. The STB devices 116 and 124 can transmit the VOD content to the television monitors 118 and 126. In an illustrative embodiment, video or audio portions of VOD content can be streamed to the STB devices 116 and 124.

The operations and management tier 108 can include an operations and management tier (OMT) switch 160 that conducts communication between the operations and management tier 108 and the public network 112. In the embodiment illustrated by FIG. 1, the OMT switch 160 is coupled to a TV2 server 162. Additionally, the OMT switch 160 can be coupled to the OSS/BSS server 164 and to a simple network management protocol (SNMP) monitor 167 that monitors network devices within or coupled to the IPTV system 100. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 can transmit the television or movie content to the AQT switch 152, and the AQT switch 152 in turn can transmit the television content to the CFT switch 130 via the private network 110 or to the OMT switch 160 via the public network 112. Further, the television content can be encoded at the D-servers 132, and the CFT switch 130 can communicate the television content to the RGs 114 and, 122 via the private access network 166. The set-top box devices 116 and 124 can receive the television content from the RGs 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to set-top box devices 116 and 124, the request can be transmitted over the private access network 166 to the VOD server 136 via the CFT switch 130. Upon receiving such a request, the VOD server 136 can retrieve requested VOD content and transmit the content to the set-top box devices 116 and 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices, such as a cellular telephone 184.

In a particular embodiment, a set-top box device such as the second set-top box device 124 can include an STB processor 170 and an STB memory device 172 that is accessible to the STB processor 170. The set-top box device 124 also includes an STB computer program 174 that is embedded within the STB memory device 172. In a particular embodiment, the STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124, by associating the user account with an IP address of the second set-top box device with data relating to one or more twisted pairs connected with the second set-top box device 124, with data related to one or more fiber optic cables connected with the second set-top box device 124, with an alphanumeric identifier of the second set-top box device 124, with any other data that is suitable for associating second set-top box device 124 with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184 The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP). Further details of the IPTV system are taught in U.S. Patent Application Publication No. 2007/0199041, the disclosure of which is hereby incorporated by reference.

Figure 2:
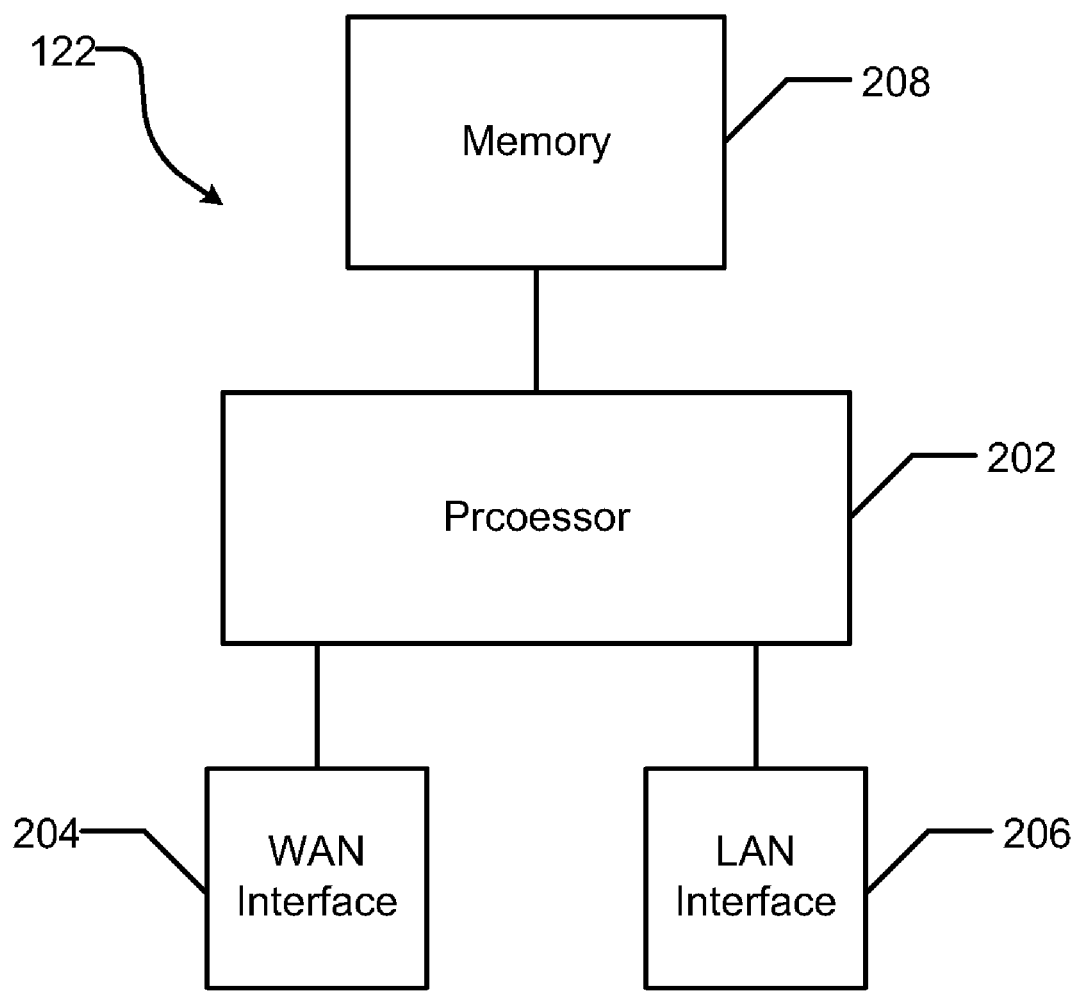
FIG. 2 is a block diagram of an embodiment of a residential gateway.

FIG. 2 shows the RG 122 in greater detail. The RG 122 can have a processor 202, a WAN interface 204, a LAN interface 206, and a memory 208. The memory 208 can include memory module 210, and can be expanded by adding an additional memory module 212. The WAN interface 204 can connect to a network provider such as through a coax cable, a twisted pair, a fiber optic cable, or a wireless link. LAN devices such as the STB 124, a computer, or voice-over-IP (VoIP) telephones can connect to the LAN interface 206 such as through a coax cable, a twisted pair, a fiber optic cable, or a wireless link. The RG 122 can provide network services to the LAN devices, such as firewall services, routing services, dynamic host configuration protocol (DHCP) services, network address translation (NAT) services, and domain name system (DNS) services. Additionally, the RG 122 can provide quality of service (QoS) functions to minimize jitter, latency, and packet loss, to high priority network traffic such as VoIP traffic and IPTV traffic. For example, the RG 122 may guarantee availability of certain resources to high priority traffic In an exemplary embodiment, the RG 122 may include trouble detection and isolation systems. The processor 202 can monitor resource utilization, such as memory utilization, CPU utilization, and bandwidth utilization. Additionally, the processor 202 can monitor other service parameters, such as NAT table utilization, routing table utilization, and firewall table utilization. Based on the monitoring of resource utilization, the processor 202 may predict over-utilization of a resource. Over-utilization of a resource may prevent the RG 122 from providing QoS to high priority traffic. When the processor 202 predicts over-utilization of a resource, the processor may log the event, send an alert, or reduce resource utilization by low priority traffic, such as by limiting network connections or flushing entries from the NAT table.

Figure 3:
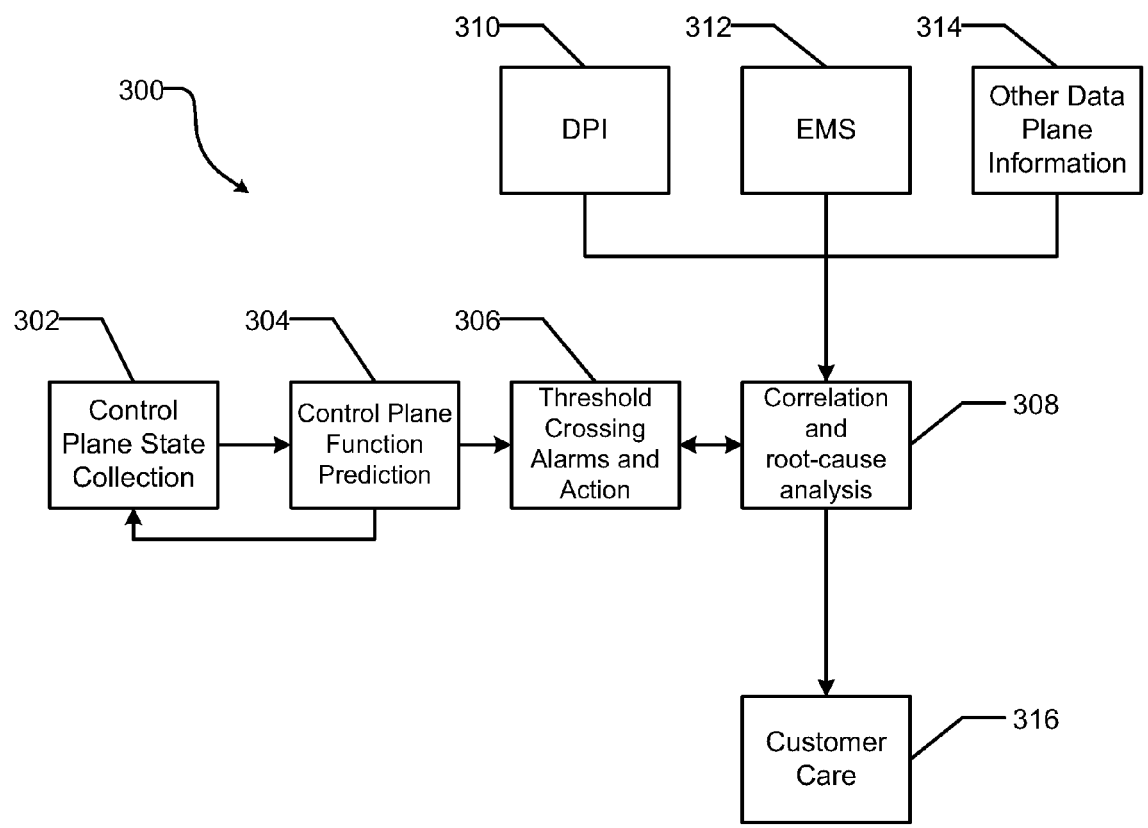
FIG. 3 is a block diagram of an embodiment of a system for trouble detection, isolation, and management.

FIG. 3 is a block diagram of an exemplary system for trouble detection, isolation, and management, generally designated 300. At 302, information about the state of the gateway device 200 is collected. The information may include CPU utilization, memory utilization, bandwidth utilization, and other service parameters. At 304, the information can be analyzed to predict resource utilization. When the analysis does not indicate over-utilization of resources, additional state information is collected at 302 for additional analysis.

When the analysis indicates the probability of over-utilization, such as when memory utilization exceeds a maximum threshold, an alarm or action may be triggered, as illustrated at 306. In an exemplary embodiment, the over-utilization may be logged or an alert may be sent, such as to customer service. Additionally, an action may be taken, such as limiting resource utilization by low priority network traffic. For example, if a maximum bandwidth is exceeded, the bandwidth available to low priority traffic, such as peer-to-peer (P2P) traffic, may be reduced.

Additionally, at 308, analysis of events leading up to the over-utilization may be performed. The analysis may utilize additional information from deep packet inspection (DPI) at 310, element management system (EMS) at 312, and state information from other network elements, such as a DSLAM and routers, at 314. The element management system 312 can provide configuration information for the RG 122. The analysis can correlate the resource utilization with subscriber activity, such as by identifying applications occupying the resource and identifying the root cause of potential service disruptions. The results of analysis may provide further actions to be taken at 306, and may be forwarded to customer service at 316.

Figure 4:
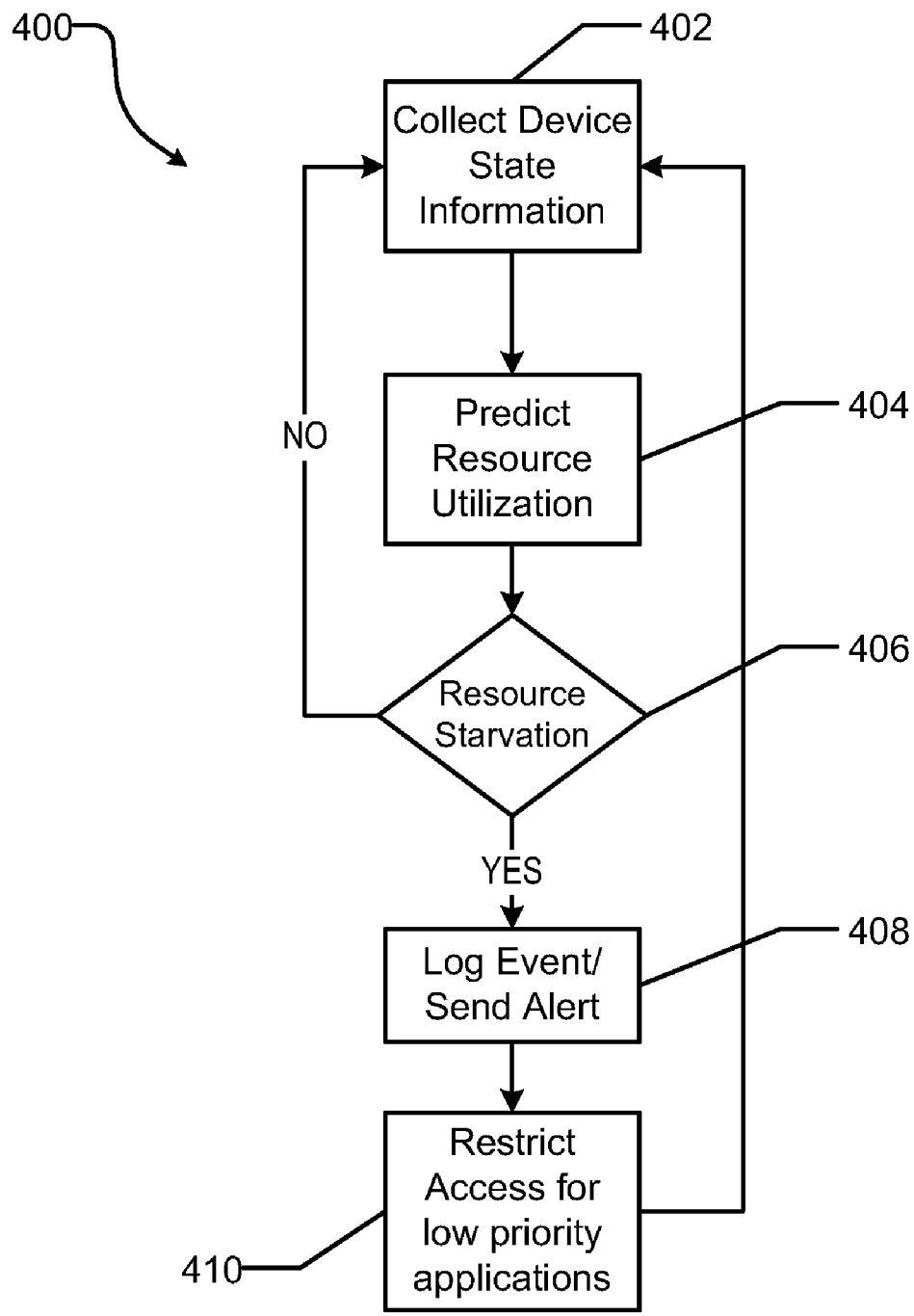
FIG. 4 is a flow chart of an exemplary method of trouble detection and isolation.

FIG. 4 is a flow diagram illustrating an exemplary method of trouble detection and isolation, generally designated 400. At 402, device state information is collected, such as CPU utilization, memory utilization, bandwidth utilization, and number of packets in inbound and outbound queues. At 404, the device state information is used to predict resource utilization. For example, high bandwidth utilization combined with growing inbound or outbound queue may signal a pending increase in latency. At 406, when the actual or predicted utilization does not exceed a threshold, the method returns to 402 to collect additional state information. When the actual or predicted utilization exceeds a threshold, the over-utilization is logged and an alert is sent, as illustrated at 408. The log or the alert may include additional information, such as the current device state information, to allow for further analysis. Additionally, at 410, the over-utilization can be isolated by limiting resources for low priority applications. For example, when a download bandwidth threshold is exceeded, low priority traffic, such as P2P and web traffic, may be limited to ensure sufficient bandwidth for high priority traffic, such as VoIP or IPTV. Additionally, excessive CPU utilization can be mitigated by limiting CPU resources available for low priority tasks, such as table maintenance tasks like garbage collection. In this way, the QoS of high priority traffic is maintained during periods of heavy utilization and low priority traffic is not restricted during periods of high utilization.

Figure 5:
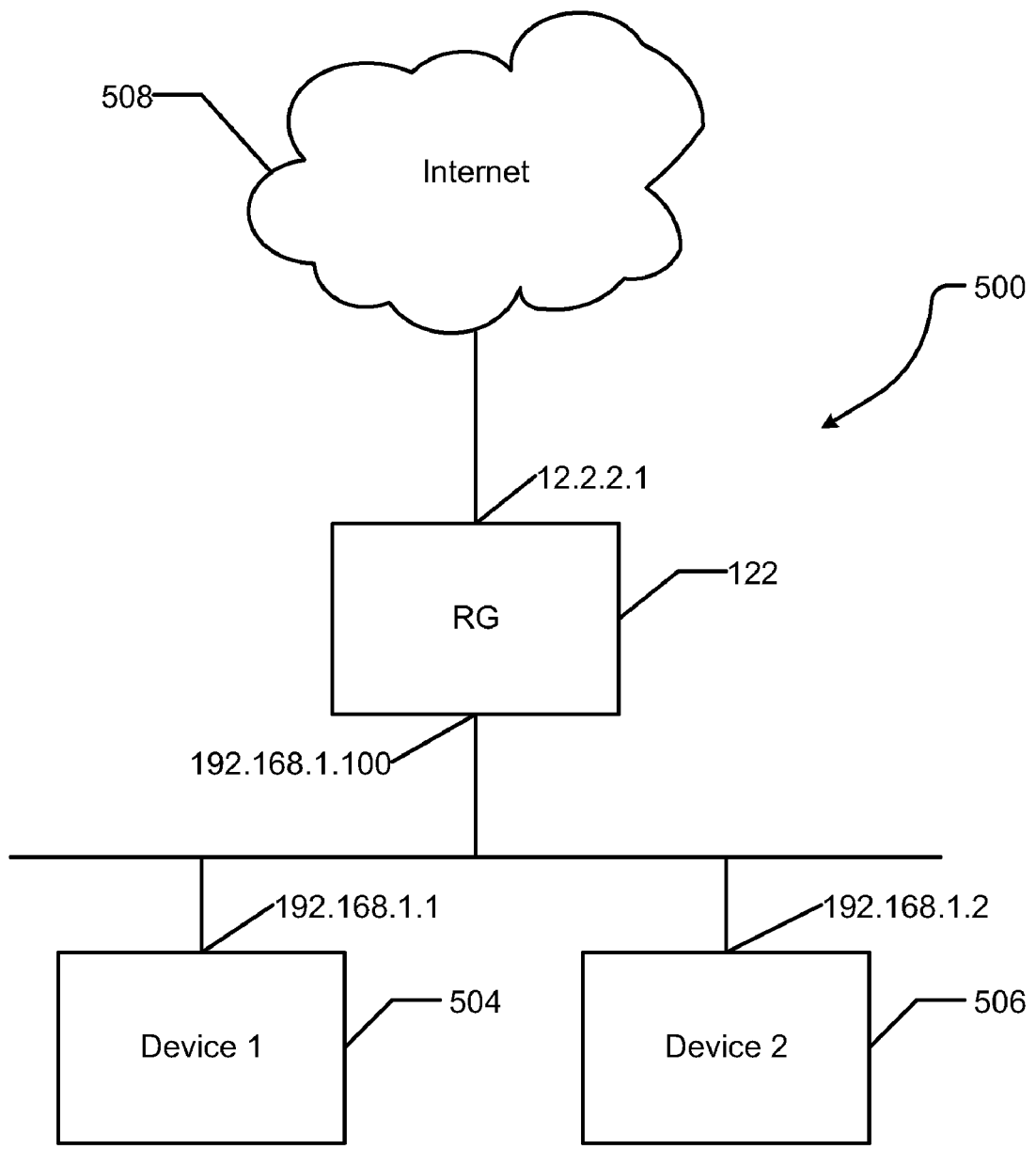
FIG. 5 is a block diagram of a network utilizing NAT.
Figure 6:
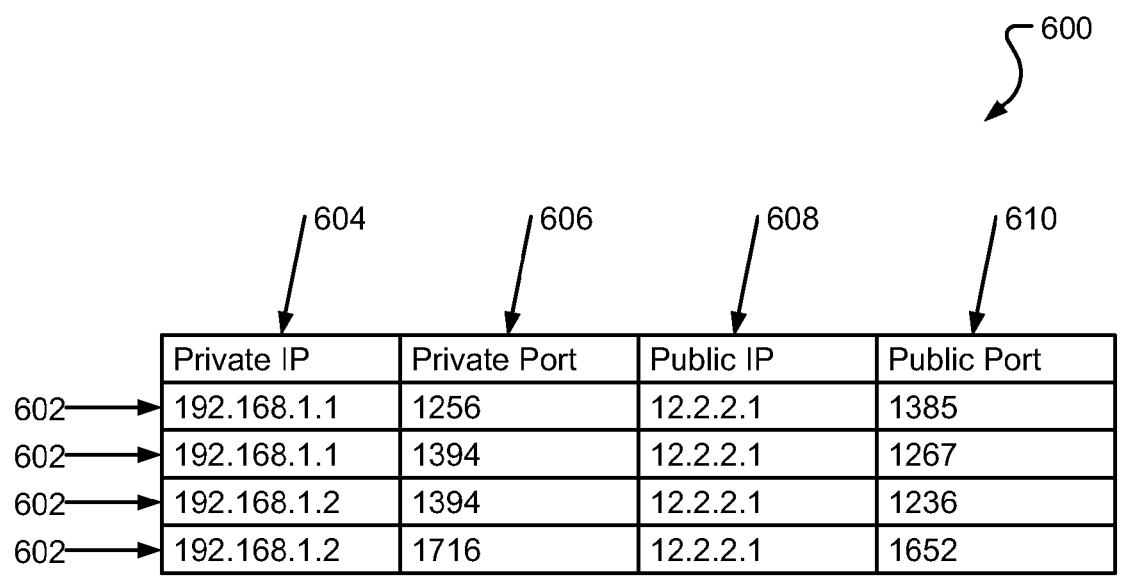
FIG. 6 is an exemplary embodiment of a NAT table.

FIGS. 5 and 6 illustrate an exemplary embodiment of a NAT. The RG 122 can connect LAN devices 504 and 506 to the Internet 508. The RG 122 has a public IP address of 12.2.2.1 and a private IP address of 192.168.1.100. Device 504 can have a private IP address of 192.168.1.1 and device 506 can have a private IP address of 192.168.1.2. A public IP address can be routable from the Internet 508, whereas a private IP address may not be routable from the Internet. The NAT provided by RG 122 allows devices 504 and 506 to utilize the public IP address of the RG 122 when communicating with the Internet 508.

When device 504 sends a request to the Internet 508, RG 122 can replace the source IP address, i.e. the private IP address of device 504, with the public IP address of RG 122. Additionally, the RG 122 may replace the source port of device 504 with a NAT port of the RG. A reply can be sent to the public IP address and the NAT port of RG 122. RG 122 can replace the destination IP address, i.e. the public IP address of the RG 122, with the private IP address of device 504. Additionally, the RG 122 can replace the destination port, i.e. the NAT port of the RG, with the port of device 504. The RG 122 can then forward the reply to the device 504.

The RG 122 can store NAT information in a NAT table, such as exemplary NAT table 600 shown in FIG. 6. The NAT table 600 stores information for a plurality of connections 602. For each connection 602, the NAT table 600 includes the private IP address 604 of device 504 or 506, the port 606 for device 504 or 506, the public IP address 608 of the RG 122, and the port 610 of the RG 122. In an alternate embodiment, the NAT table can also include the public IP address and the port of an Internet device, such as a web server. The RG 122 can use the address and port information of the Internet device to further identify a connection between a device 504 or 506 and an Internet device. When storing the address and port information of the Internet device, a port of the RG 122 can be used for more than one connection.

Figure 7:
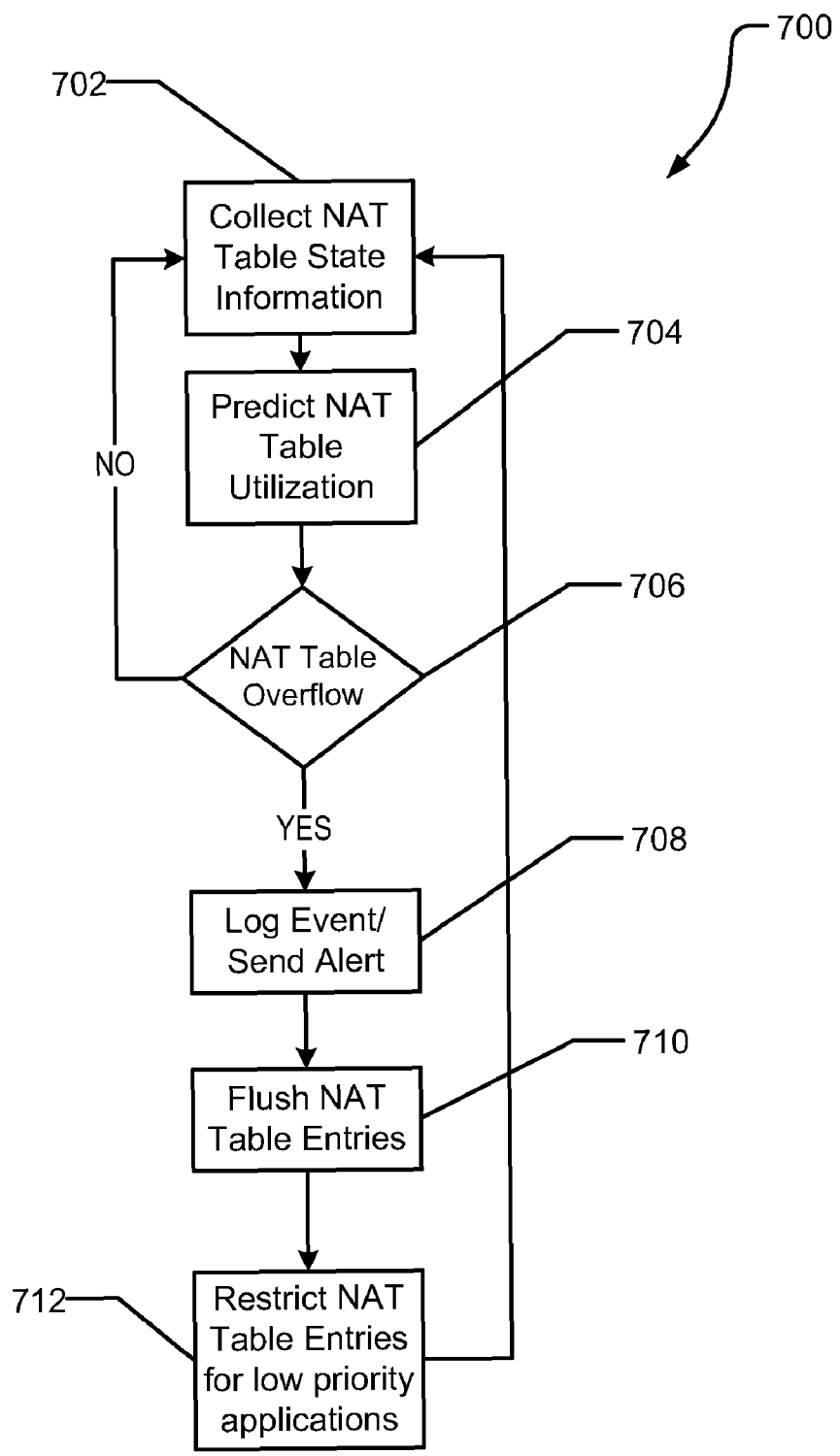
FIG. 7 is a flow chart of an exemplary method of trouble detection and isolation.

FIG. 7 is a flow diagram illustrating an exemplary method of trouble detection and isolation, generally designated 700. At 702, NAT table state information is collect. The NAT table state information can include the number of entries already in the table and the amount of available space in the NAT table. At 704, the NAT table state information is used to predict NAT table utilization. NAT table overflow occurs when all available space in the NAT table is in use. When NAT table overflow occurs, network connections may be dropped and additional network connections may be prevented. At 706, when NAT table overflow is not predicted, the device returns to 702 to collect additional NAT table state information.

Alternatively, when NAT table overflow occurs or is predicted, the event can be logged and an alert can be sent, as illustrated at 708. The log or the alert may include additional information, such as the entries in the NAT table, to allow further analysis. Analysis may identify which device or application is requesting an excessive number of NAT table entries. At 710, to alleviate the NAT table overflow, NAT table entries may be deleted. In an exemplary embodiment, substantially all NAT table entries may be deleted. In an alternate embodiment, NAT table entries from low priority network traffic may be deleted. In yet another exemplary embodiment, a portion of or substantially all NAT table entries from devices or applications utilizing an excessive number of NAT table entries. To isolate the NAT table overflow, NAT table entries may be restricted for low priority network traffic, as illustrated at 712.

Figure 8:
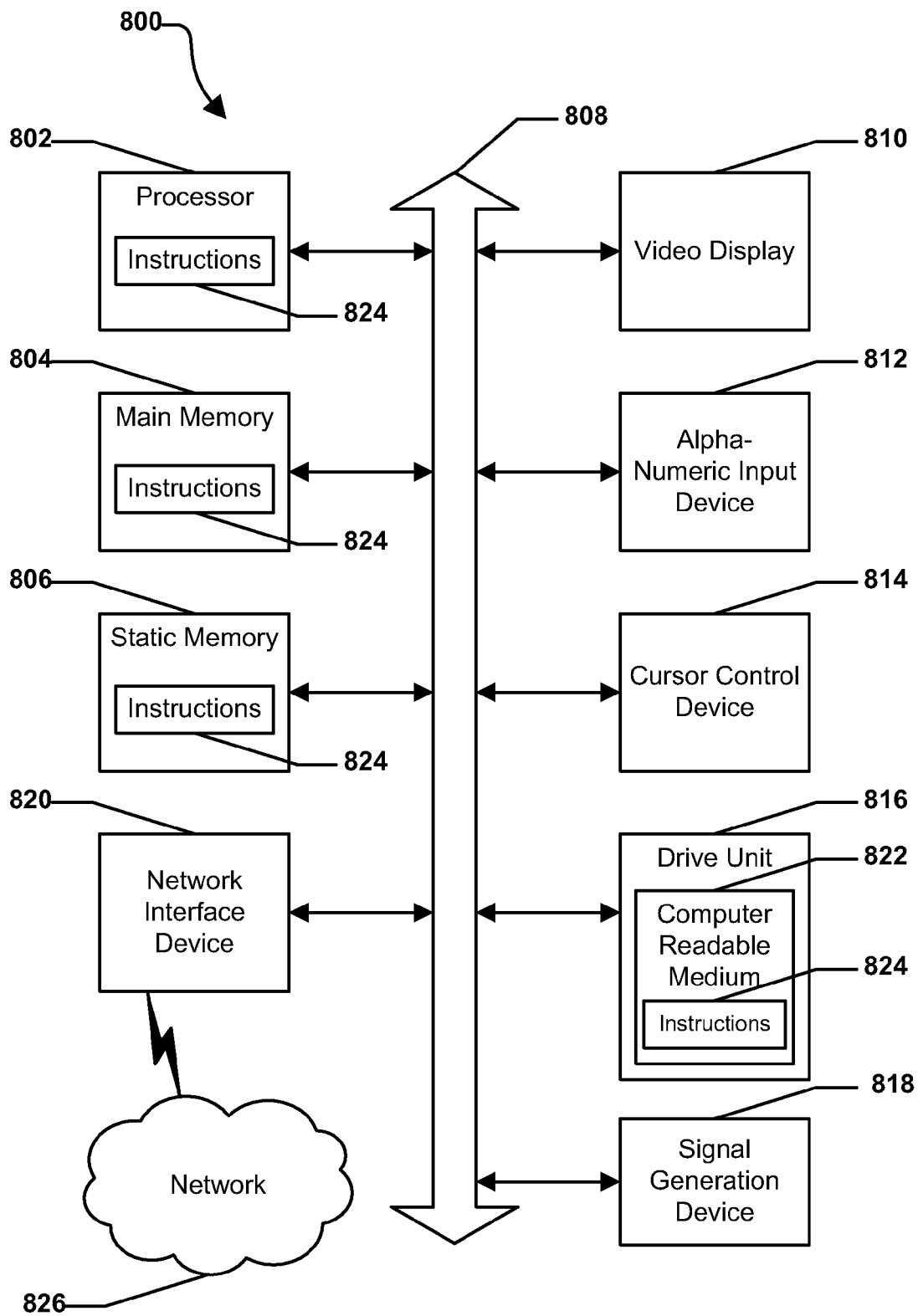
FIG. 8 is an illustrative embodiment of a general computer system.

FIG. 8 shows an illustrative embodiment of a general computer system 800. The computer system 800 can include a set of instructions that can be executed to cause the computer system to perform any one or more of the methods or computer based functions disclosed herein. The computer system 800 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 800 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 800 can be implemented using electronic devices that provide voice, video or data communication. Further, while a single computer system 800 is illustrated, the term "system" shall also be taken to include any collection of systems or sub-systems that individually or jointly execute a set, or multiple sets, of instructions to perform one or more computer functions.

The computer system 800 may include a processor 802, such as a central processing unit (CPU), a graphics processing unit (GPU), or both. Moreover, the computer system 800 can include a main memory 804 and a static memory 806 that can communicate with each other via a bus 808. As shown, the computer system 800 may further include a video display unit 810 such as a liquid crystal display (LCD), an organic light emitting diode (OLED), a flat panel display, a solid state display, or a cathode ray tube (CRT). Additionally, the computer system 800 may include an input device 812 such as a keyboard, and a cursor control device 814 such as a mouse. The computer system 800 can also include a disk drive unit 816, a signal generation device 818 such as a speaker or remote control, and a network interface device 820 to communicate with a network 826. In a particular embodiment, the disk drive unit 816 may include a computer-readable medium 822 in which one or more sets of instructions 824, such as software, can be embedded. Further, the instructions 824 may embody one or more of the methods or logic as described herein. In a particular embodiment, the instructions 824 may reside completely, or at least partially, within the main memory 804, the static memory 806, and/or within the processor 802 during execution by the computer system 800. The main memory 804 and the processor 802 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A gateway comprising:
   a memory configured to include a network address translation table for a plurality of network services including peer-to-peer traffic, web traffic, voice over internet protocol service and internet protocol television service, wherein a first portion of the plurality of network services have a lower priority than a second portion of the plurality of network services; and
   a processor coupled to the memory, wherein the memory further comprises computer instructions, which when executed by the processor cause the processor to:
   determine a number of entries within the network address translation table;
   identify a likelihood of a fault, the fault including the number of entries exceeding a threshold; and
   modify a limit on the number of entries available to a subset of the plurality of network services comprising peer-to-peer traffic or web traffic in response to the likelihood of the fault, the limit corresponding to a maximum number of entries available to the first portion of the plurality of network services that have the lower priority.

2. The gateway of claim 1, wherein the processor is further configured to generate a log in response to the likelihood of the fault and wherein the subset of the plurality of network services comprises peer-to-peer traffic and web traffic.

3. The gateway of claim 2, wherein the log is sent to a server and wherein the processor is further configured to limit table maintenance tasks including limiting garbage collection when the likelihood of the fault is identified.

4. The gateway of claim 2, wherein the log includes device state information.

5. A gateway comprising:
a memory configured to include a network address translation table for a plurality of network services on a network carrying web traffic, voice over internet protocol service and internet protocol television service, wherein a first subset of the plurality of network services have a lower priority than a second subset of the plurality of network services; and
a processor coupled to the memory, wherein the memory further comprises computer instructions, which when executed by the processor cause the processor to:
determine processor utilization;
identify a likelihood of a fault, the fault including the processor utilization exceeding a threshold; and
modify a limit on the number of entries available to the first subset of the plurality of network services having the lower priority and modify a limit on processor utilization of table maintenance tasks of the network address translation table in response to the likelihood of the fault, the limit on processor utilization corresponding to a maximum amount of processor cycles available for table maintenance tasks.

6. The gateway of claim 5, wherein the processor is further configured to generate a log in response to the likelihood of the fault.

7. The gateway of claim 6, wherein the log includes device state information.

8. A computer-implemented method of preventing a fault in an internet protocol television network, the method comprising:
collecting information in a memory of a device, the information including network state information, network utilization information, and device state information associated with a plurality of network services, a first portion of the plurality of network services having lower priority than a second portion of the plurality of network services;
determining a likelihood of the fault based on the information in the memory, the fault including an insufficient processor or memory resource to ensure a quality of service for an internet protocol television data stream and voice over internet protocol data stream;
analyzing the information to correlate a resource utilization with a subscriber activity;
limiting a number of entries available to the first portion of the plurality of network services within a network address translation table in response to the likelihood of the fault; and
limiting a processor or memory usage of the subscriber activity in response to the likelihood of the fault, wherein modifying is done to limit the effect of the subscriber activity on the quality of service for an internet protocol television data stream and voice over internet protocol data stream.

9. The method of claim 8, wherein the device is a gateway.

10. The method of claim 8, wherein the information includes one of memory usage, processor load, bandwidth usage, or any combination thereof.

11. The method of claim 8, further comprising generating a log in response to the likelihood of the fault.

12. The method of claim 11, wherein the log includes device state information.

13. The method of claim 8, wherein the network state information includes one of deep packet inspection, device configuration, device state information, control plane function prediction, or any combination thereof.

* * * * *